(12) United States Patent
Ablabutyan

(10) Patent No.: US 12,214,708 B2
(45) Date of Patent: Feb. 4, 2025

(54) TORSION BAR BRACKET WITH BUSHING

(71) Applicant: MAXON INDUSTRIES, INC., Santa Fe Springs, CA (US)

(72) Inventor: Karapet Ablabutyan, Glendale, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 17/634,383

(22) PCT Filed: Oct. 22, 2020

(86) PCT No.: PCT/US2020/056902
§ 371 (c)(1),
(2) Date: Feb. 10, 2022

(87) PCT Pub. No.: WO2021/081233
PCT Pub. Date: Apr. 29, 2021

(65) Prior Publication Data
US 2022/0410785 A1 Dec. 29, 2022

Related U.S. Application Data

(60) Provisional application No. 62/925,145, filed on Oct. 23, 2019.

(51) Int. Cl.
*B60P 1/44* (2006.01)
*F16C 17/02* (2006.01)

(52) U.S. Cl.
CPC .......... *B60P 1/4421* (2013.01); *B60P 1/4492* (2013.01); *F16C 17/02* (2013.01)

(58) Field of Classification Search
CPC ......... B60P 1/44; B60P 1/4407; B60P 1/4414; B60P 1/4421; B60P 1/4428; B60P 1/4435;

(Continued)

(56) References Cited

U.S. PATENT DOCUMENTS 3,517,838 A 6/1970 Lugash
5,476,163 A * 12/1995 Wu .................. A45C 13/262
16/113.1

(Continued)

FOREIGN PATENT DOCUMENTS

CN 206012260 U * 3/2017
EP 875421 A1 * 11/1998 .............. B60P 1/438

(Continued)

OTHER PUBLICATIONS

Maxon Lift. RA Side Door Slidelift. YouTube. Nov. 12, 2015 (Nov. 12, 2015) [retrieved on Dec. 8, 2020]. Retrieved from internet: <URL:https://www.youtube.com/watch?v=CXhWNknB-d4>entire video. See pp. 7, 8 of the ISA/237.

(Continued)

*Primary Examiner* — James Keenan
(74) *Attorney, Agent, or Firm* — Command IP LLP; Michael Zarrabian

(57) ABSTRACT

Systems, devices, and methods for a sliding bar disposed between a platform section and a flipover of a lift platform; a rotatable portion connected to the platform section, wherein the sliding bar is fixedly connected to the rotatable portion; a receiver portion connected to the flipover; a sliding bar mount pivotally connected to the receiver portion; and a bushing disposed in the sliding bar mount where the bushing slidably receives a portion of the sliding bar; where the bushing reduces a pull force for moving the flipover between at least one of: an open position and a vertical position and a closed position and a vertical position.

20 Claims, 18 Drawing Sheets

(58) Field of Classification Search
CPC ....... B60P 1/4442; B60P 1/445; B60P 1/4457;
B60P 1/4464; B60P 1/4471; B60P
1/4478; B60P 1/4485; B60P 1/4492;
B60P 1/4463; F16C 17/02
USPC ......................................................... 414/545
See application file for complete search history.

(56) References Cited

U.S. PATENT DOCUMENTS

| | | | | |
|---|---|---|---|---|
| 6,619,639 | B1 * | 9/2003 | Shelley | ................... F16C 17/02 |
| | | | | 267/293 |
| 9,205,771 | B2 * | 12/2015 | Ablabutyan | ........... B60P 1/4414 |
| 9,341,212 | B2 | 5/2016 | Hambardzumyan | |
| 2006/0245886 | A1 | 11/2006 | Krause | |
| 2023/0160425 | A1 * | 5/2023 | Ichikawa | ................. F16C 17/02 |
| | | | | 384/276 |

FOREIGN PATENT DOCUMENTS

| | | | | | |
|---|---|---|---|---|---|
| EP | 1213176 | A1 | * | 6/2002 | ............ B60P 1/4492 |
| GB | 1368173 | A | | 9/1974 | |
| GB | 2024141 | A | * | 1/1980 | ............ B60P 1/4421 |
| GB | 2124998 | A | * | 2/1984 | ............ B60P 1/4421 |

OTHER PUBLICATIONS

International Search Report and Written Opinion for PCT/US2020/056902, mailed Feb. 4, 2021.

* cited by examiner

TORSION BAR BRACKET WITH BUSHING

CROSS-REFERENCE TO RELATED APPLICATION

This application is a 35 U.S.C § 371 National Stage Entry of International Application No. PCT/US2020/056902, filed Oct. 22, 2020, which claims the priority to and the benefit of U.S. Provisional Patent Application Ser. No. 62/925,145, filed Oct. 23, 2019, all of which are hereby incorporated herein by reference in their entirety for all purposes.

FIELD OF ENDEAVOR

The invention relates generally to lift gates, and more particularly to lift gates with lift platforms having a flipover.

BACKGROUND

Lifts such as lift gates and accompanying lift platforms are typically mounted at a structure such as an opening at a rear of a vehicle to lift payloads on the lift platform from one level (e.g., ground level) up to another level (e.g., the bed of the vehicle), or vice versa. Operation of a lifting mechanism may rotate the lift platform into an inverted, stowed position beneath the vehicle body. Actuators, such as hydraulic actuators and electric actuators, are used to provide a lifting force for moving the lift platform.

SUMMARY

A system embodiment may include: a sliding bar disposed between a platform section and a flipover of a lift platform; a rotatable portion connected to the platform section, where the sliding bar may be fixedly connected to the rotatable portion; a receiver portion connected to the flipover; a sliding bar mount pivotally connected to the receiver portion; and a bushing disposed in the sliding bar mount, where the bushing slidably receives a portion of the sliding bar; where the bushing reduces a pull force for moving the flipover between at least one of: an open position and a middle position, and a closed position and a middle position.

In additional system embodiments, the bushing may be made from plastic. In additional system embodiments, the bushing may be a plastic nylon. In additional system embodiments, the bushing may be made from Teflon.

Additional system embodiments may further include: a torsion bar disposed in the platform section, where the torsion bar may be connected to the rotatable portion. In additional system embodiments, the torsion bar may be a single bar further comprising the sliding bar and the rotatable portion. In additional system embodiments, a perimeter of an aperture of the bushing corresponds to a cross-section of the sliding bar.

In additional system embodiments, the torsion bar may be attached at a first attachment point in the platform section, where the torsion bar comprises a twist between the rotatable portion and the first attachment point to reduce the pull force for moving the flipover. In additional system embodiments, the torsion bar length may be greater than half a width of the platform section. In additional system embodiments, the torsion bar rotates during movement of the flipover to reduce the pull force for moving the flipover. In additional system embodiments, the platform section comprises one or more apertures to allow the torsion bar to extend through the platform section and rotate during movement of the flipover.

Additional system embodiments may further include: a bracket attached to the flipover, where the receiver portion may be connected to the flipover via the bracket. In additional system embodiments, the receiver portion may be welded to the bracket. In additional system embodiments, the sliding bar mount further comprises: an adjustable mechanism configured to adjust friction between the sliding bar and the sliding bar mount. In additional system embodiments, the adjustable mechanism comprises at least one of: a fastener, a screw, and a nut and a bolt. In additional system embodiments, the adjustable mechanism and the sliding bar mount form a yoke holder about the bushing.

In additional system embodiments, at least a portion of the sliding bar maintains contact with the bushing as the flipover may be moved between at least one of: an open position and a vertical position, and a closed position and a vertical position. In additional system embodiments, the platform section may be substantially parallel with the flipover in the open position, where the platform section may be substantially perpendicular to the flipover in the middle position, and where the flipover may be folded over the platform section in the closed position. In additional system embodiments, the bushing comprises at least one flange to secure the bushing in the sliding bar mount.

Another system embodiment may include: a lift platform comprising: a platform section; and a flipover, where the flipover moves relative to the platform section, where the platform section may be substantially parallel with the flipover in an open position, where the platform section may be substantially perpendicular to the flipover in a middle position, and where the flipover may be folded over the platform section in a closed position; a torsion bar bracket installed between the platform section and the flipover of the lift platform; a torsion bar disposed in the platform section, where the torsion bar may be attached to the torsion bar bracket at a first end of the torsion bar and attached at a first attachment point in the platform section at a second end of the torsion bar, where the torsion bar comprises a twist between the rotatable portion and the first attachment point to reduce a pull force for moving the flipover between at least two of: the open position, the middle position, and the closed position; a sliding bar disposed between a platform section and a flipover of a lift platform, where the sliding bar may be connected to the torsion bar; and a bushing of the torsion bar bracket, where the bushing slidably receives a portion of the sliding bar, and where the bushing reduces a pull force for moving the flipover between at least two of: the open position, the middle position, and the closed position.

In additional system embodiments, the torsion bar bracket further comprises: a rotatable portion connected to the platform section, where the sliding bar may be connected to the rotatable portion, and where the torsion bar may be connected to the rotatable portion. In additional system embodiments, the torsion bar bracket further comprises: a receiver portion connected to the flipover; and a sliding bar mount pivotally connected to the receiver portion; and where the bushing may be disposed in the sliding bar mount. In additional system embodiments, the torsion bar may be a single bar further comprising the sliding bar and the rotatable portion.

Another system embodiment may include: a lift platform comprising: a platform section; and a flipover, where the flipover moves relative to the platform section, where the platform section may be substantially parallel with the flipover in an open position, where the platform section may be substantially perpendicular to the flipover in a middle position, and where the flipover may be folded over the platform section in a closed position; a first torsion bar bracket installed between the platform section and the flipover of the lift platform on a first side of the lift platform; a first torsion bar disposed in the platform section, where the first torsion bar may be attached to the first torsion bar bracket via a bushing at a first end of the first torsion bar and attached at a first attachment point in the platform section at a second end of the first torsion bar, where the first torsion bar comprises a twist between the rotatable portion and the first attachment point to reduce a pull force for moving the flipover between at least two of: the open position, the middle position, and the closed position; a second torsion bar bracket installed between the platform section and the flipover of the lift platform on a second side of the lift platform, where the second side of the lift platform may be opposite the first side of the lift platform; and a second torsion bar disposed in the platform section, where the second torsion bar may be attached to the second torsion bar bracket via a bushing at a first end of the second torsion bar and attached at a second attachment point in the platform section at a second end of the second torsion bar, where the second torsion bar comprises a twist between the rotatable portion and the first attachment point to reduce a pull force for moving the flipover between at least two of: the open position, the middle position, and the closed position; where each bushing reduces a pull force for moving the flipover between at least two of: the open position, the middle position, and the closed position.

In additional system embodiments, each of the first torsion bar bracket and the second torsion bar bracket further comprise: a sliding bar; a rotatable portion connected to the platform section, where the sliding bar may be fixedly connected to the rotatable portion; a receiver portion connected to the flipover; and a sliding bar mount pivotally connected to the receiver portion; where the bushing may be disposed in the sliding bar mount, where the bushing slidably receives a portion of the sliding bar. In additional system embodiments, the first torsion bar length may be greater than half a width of the platform section, where the second torsion bar length may be greater than half the width of the platform section, where the first torsion bar and the second torsion bar rotate during movement of the flipover to reduce the pull force for moving the flipover, and where the platform section comprises one or more apertures to allow the first torsion bar and the second torsion bar to extend through the platform section and rotate during movement of the flipover. In additional system embodiments, the first torsion bar may be a single bar further comprising the sliding bar and the rotatable portion, and where the second torsion bar may be a single bar further comprising the sliding bar and the rotatable portion.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present system allows for a torsion bar bracket connected between a platform section and a flipover of a lift platform. The torsion bar bracket includes a sliding bar fixedly attached to a rotatable portion. The rotatable portion is attached to a torsion bar disposed in a platform section of the lift platform. The system reduces the pull force required to move the flipover between an open position and a vertical position. The system also reduces the pull force required to move the flipover between a closed position and a vertical position. In the vertical position the angle between the flipover and the platform section is 90 degrees. The vertical position is a zero torque position in the system. When the flipover goes from the vertical position to the open position, it twists the torsion bar which then provides torque when the user wants to move the flip over from the open position to the vertical position, and vice versa. A bushing may receive at least a portion of the sliding bar to reduce the required pull force further and prevent metal-to-metal contact. The bushing may be made from a plastic, such as plastic nylon, Teflon, or the like. The bushing acts as a sliding bearing to overcome sliding friction in the system.

Figure 1:
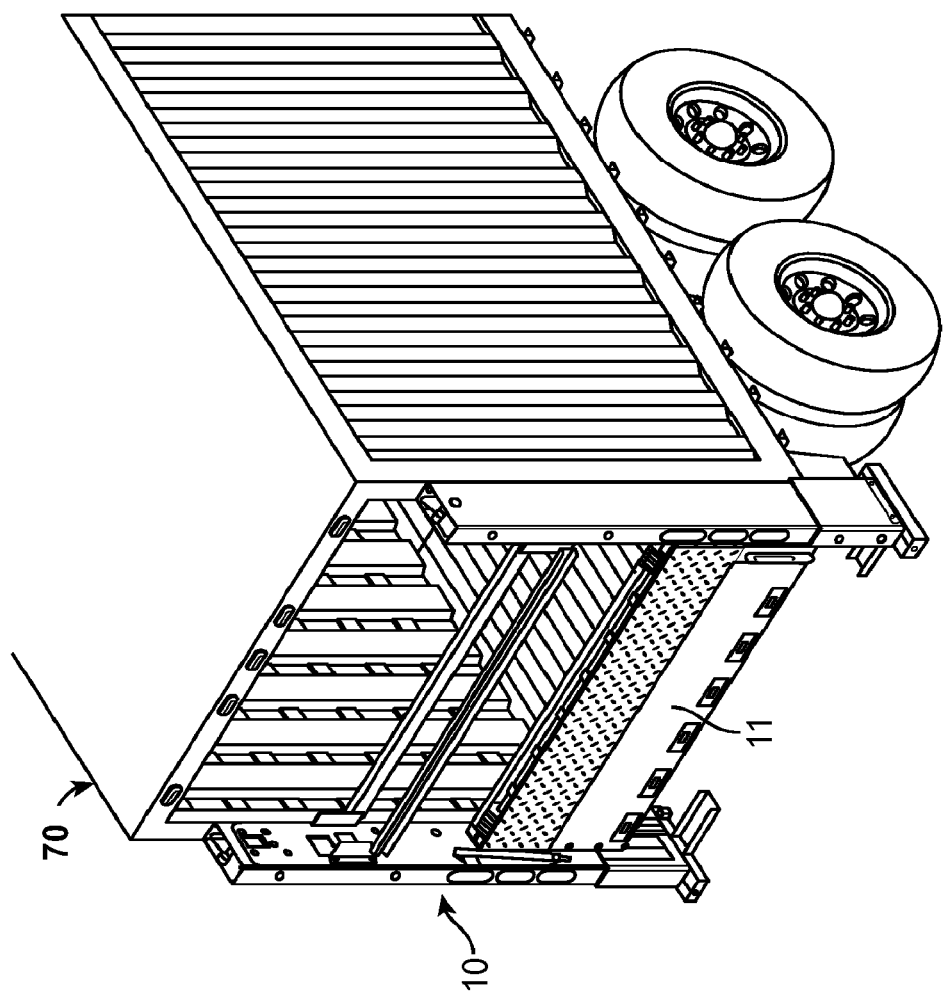
FIG. 1 shows a lift gate mounted at a structure such as an opening at the rear of the vehicle, according to one embodiment.

FIG. 1 shows a lift gate 10 mounted at a structure such as an opening at the rear of the vehicle 70, according to one embodiment. The lift gate 10 allows lifting payloads on a platform 11 from one level (e.g., the ground level) up to another level (e.g., the bed of the vehicle), or vice versa.

Figure 2:
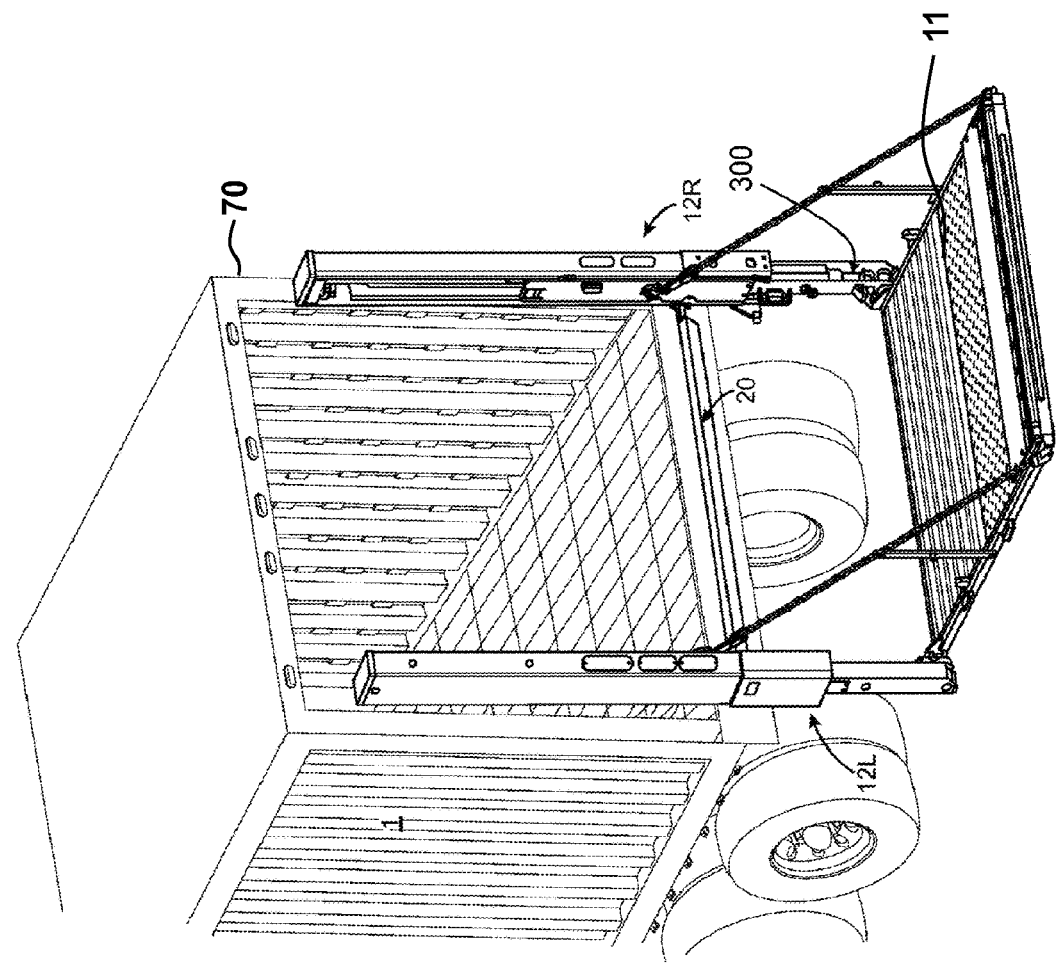
FIG. 2 shows a perspective view of a lift system as mounted on a vehicle opening, according to one embodiment.

FIG. 2 shows a perspective view of a lift system as mounted on a vehicle opening, according to one embodiment. In operation, when the lift platform 11 is raised to the vehicle bed of vehicle 70, there is substantially continuous surface from the vehicle bed to the lift platform 11 to ease movement of loads between the vehicle bed and the lift platform. Vehicle 70 may be a truck with a rear opening, suitable for installing a lift gate. In one embodiment, a lift gate system comprises a load elevator in the form of a lift gate. The lift gate provides a dual lift system including a parallel pair of vertically extending columns 12L, 12R, each having a vertically-disposed hydraulic cylinder for vertically raising and lowering a load carried by the pair of cylinders.

The lift gate may include a rigid H-frame having said parallel pair of upstanding columns 12L, 12R. The columns 12L, 12R may contain a corresponding pair of vertically-disposed hydraulic cylinders having runners interconnected by a transverse stabilizing bar typically supporting a lifting platform actuated on each side by an actuating linkage system. The lift gate may include the lift platform 11 supported between the left support column 12L and right support column 12R. The support columns 12L, 12R may include actuators, 300 for lowering and/or raising the lift platform 11.

The lift gate 10 is mounted at a structure such as an opening at the rear of the vehicle 70 using a mounting system in one embodiment. The lift gate 10 allows lifting payloads on the platform 11 from one level (e.g., the ground level) up to another level (e.g., the bed of the vehicle), or vice versa.

Figure 3:
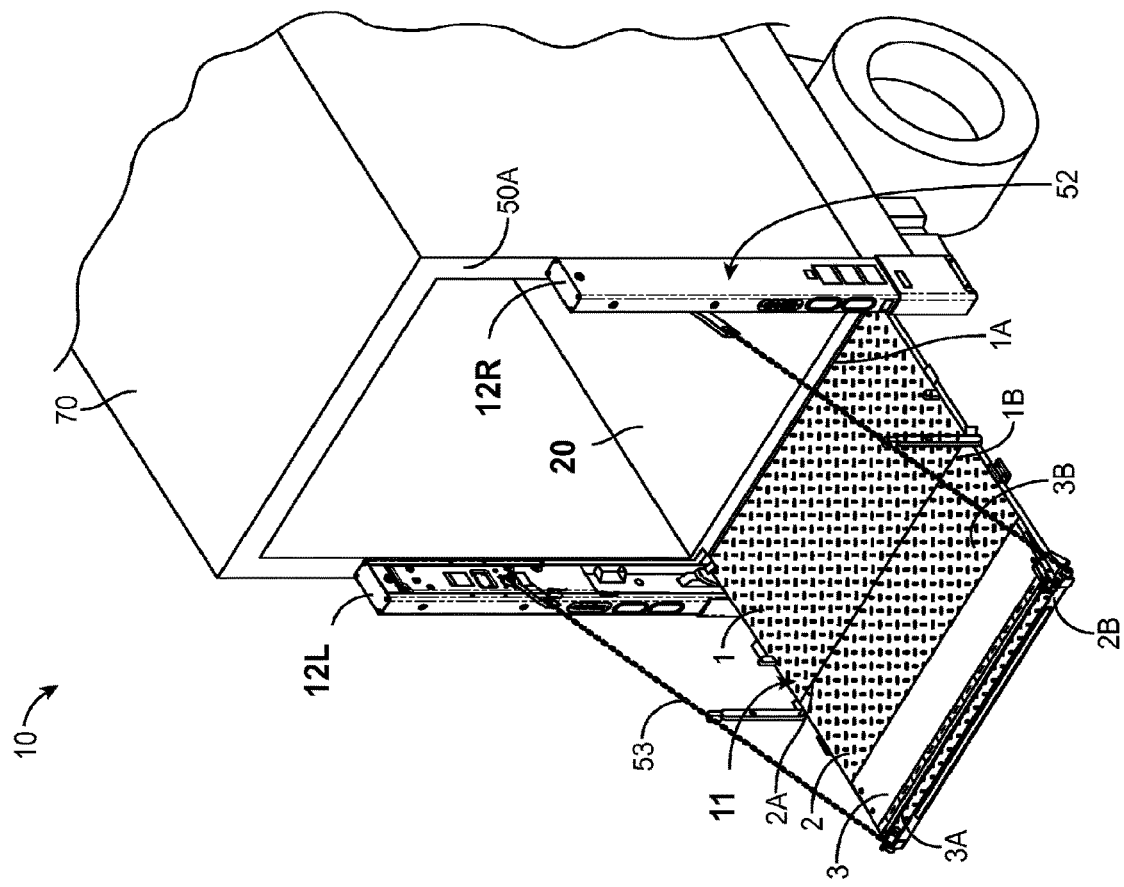
FIG. 3 shows a perspective view of a lift gate system, in accordance with an embodiment of the invention.

FIG. 3 illustrates a perspective view of a lift gate 10, in accordance with an embodiment of the invention. The lift gate 10 is configured for mounting at a structure such as a rear frame of a vehicle (e.g., a truck) 70. For example, the lift gate 10 may be attached to a rear frame 50A of a vehicle 70 as shown in FIG. 1.

The lift gate 10 comprises a lifting mechanism 52 including a parallel pair of vertically extending columns 12L, 12R for moving a lift platform 11 between a raised position and a lowered position. Each column 12L, 12R may include a vertically disposed actuator therein for vertically raising and lowering the lift platform 11, such as between ground level (FIG. 2) and the level of a vehicle bed 20 of the vehicle 70. A pair of collapsible linkages 53 may interconnect the lift platform 11 with the columns 12L, 12R along linkage points on sides of the lift platform 11. The linkages 53 may maintain the lift platform 11 in a horizontal plane through the lifting range. In some embodiments, the linkages 53 may not be used.

The columns 12L, 12R raise/lower the lift platform 11 for lifting payloads thereon from one level (e.g., ground level in FIG. 2) to another level (e.g., the vehicle bed 20 of the vehicle 70 in FIG. 3), or vice versa. In FIG. 3, the lift platform 11 is shown in an unfolded position, wherein the lift platform 11 is substantially aligned with the vehicle bed 20 when the lift platform 11 is in the raised position.

The lift platform 11 includes at least one load-carrying surface including a platform section 1, and a foldable section ("flipover") 2. In some embodiments, the lift platform 11 may also include a ramp 3.

The platform section 1 may have a first edge 1A and a second edge 1B that is opposite of the first edge 1A. The flipover 2 may have a first edge 2A and a second edge 2B that is opposite of the first edge 2A. The first edge 2A of the flipover 2 may be pivotally coupled to the second edge 1B of the platform section 1.

The ramp 3 may have a first edge 3A and a second edge 3B that is opposite of the first edge 3A. The first edge 3A of the ramp 3 may be pivotally coupled to the second edge 2B of the flipover 2. In one embodiment, the first edge 3A of the ramp 3 may be pivotally coupled to the second edge 2B of the flipover 2 via a locking assembly and/or a hinge assembly.

Figure 4:
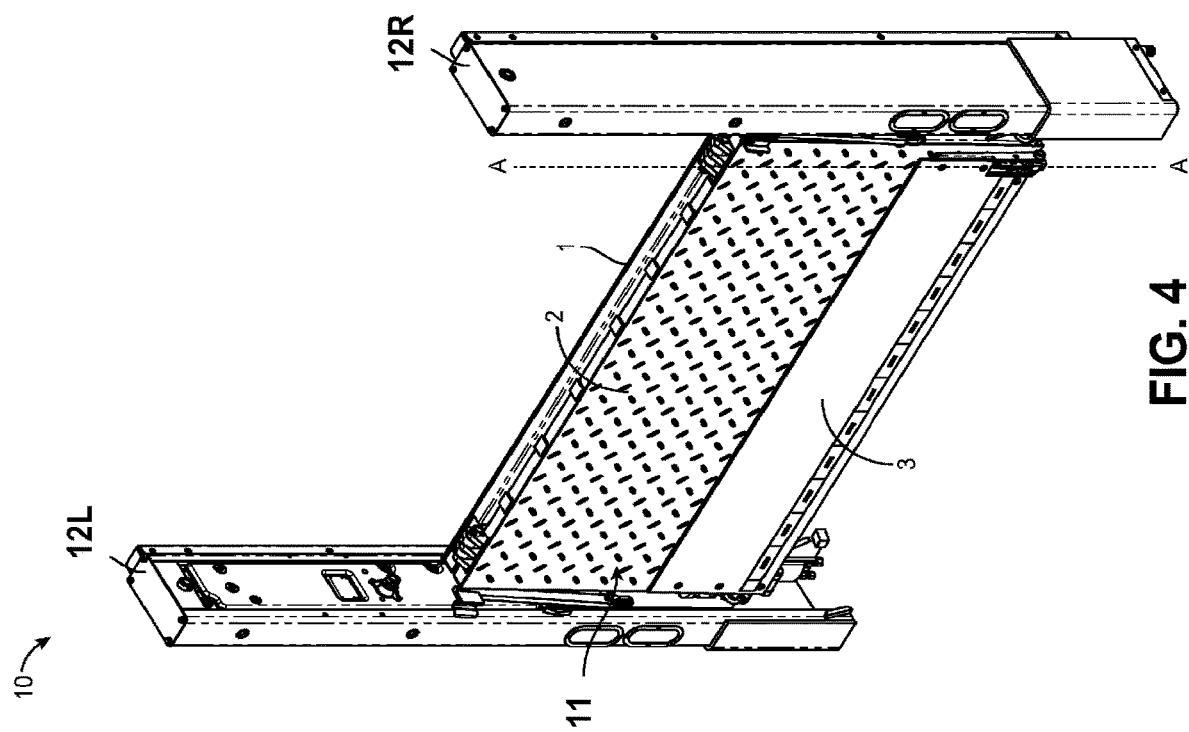
FIG. 4 shows a side perspective view of the lift platform in the stowed position, in accordance with an embodiment of the invention.

FIG. 4 shows a perspective view of the lift gate 10, wherein the lift platform 11 is in folded and stowed position between the columns 12L, 12R, and the ramp 3 is maintained in the stowed position relative to the flipover 2, in accordance with an embodiment of the invention. As noted, the lifting mechanism comprises a parallel pair of vertically extending standards, posts or columns 12L, 12R, each having a vertically disposed actuator for vertically raising and lowering the lift platform 11 between ground level and the vehicle bed. The linkages (e.g., chains) may maintain the lift platform 11 in a horizontal plane through the lifting range of the lift platform 11. The lifting mechanism may also rotate the lift platform 11 into a stowed position. In the stowed position, the lift platform 11 may be fully folded, inverted, and vertically disposed between the columns 12L, 12R.

Figure 5:
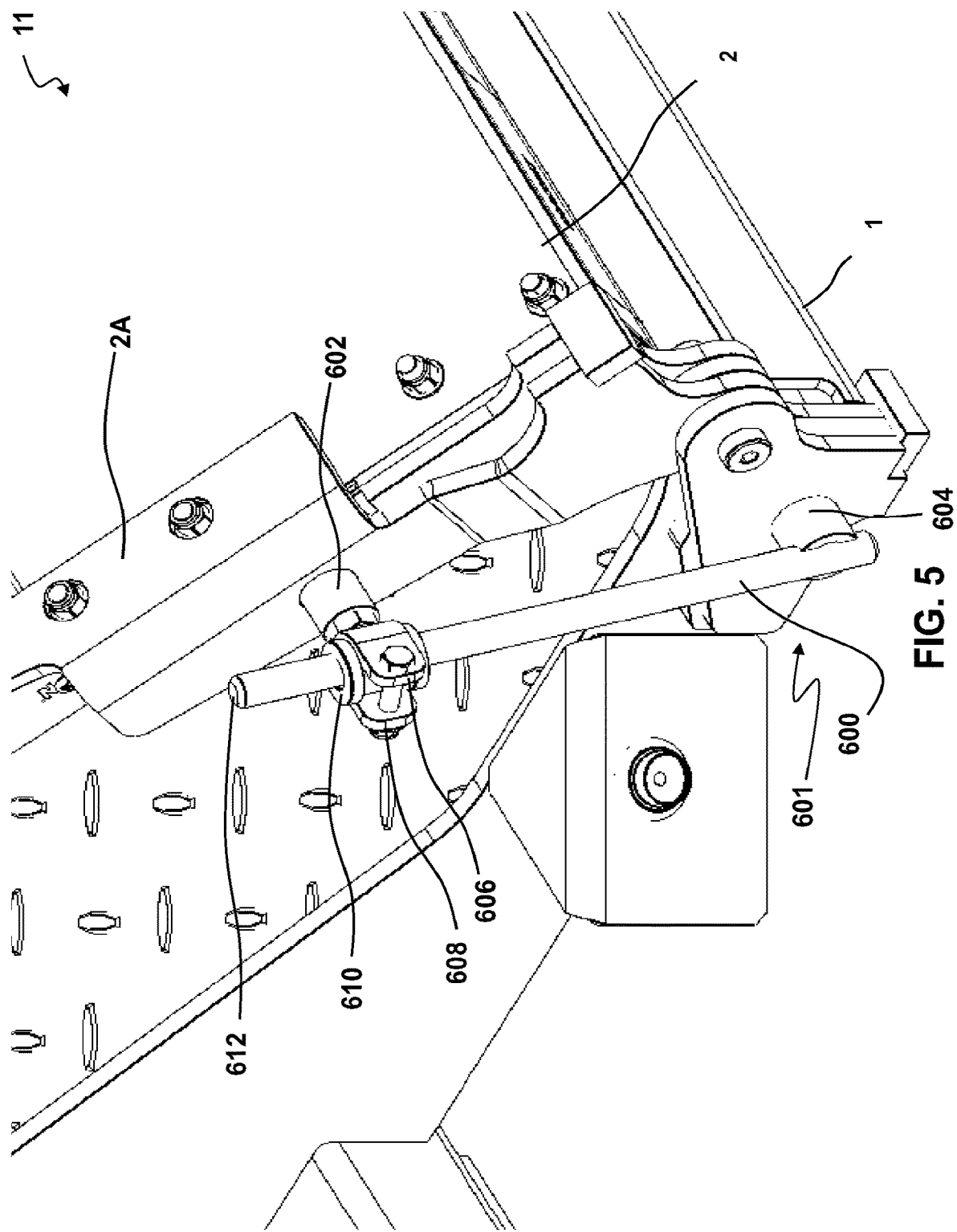
FIG. 5 shows a perspective view of a torsion bar bracket installed between a platform section and a flipover of a lift platform in a half folded position, according to one embodiment.
Figure 9:
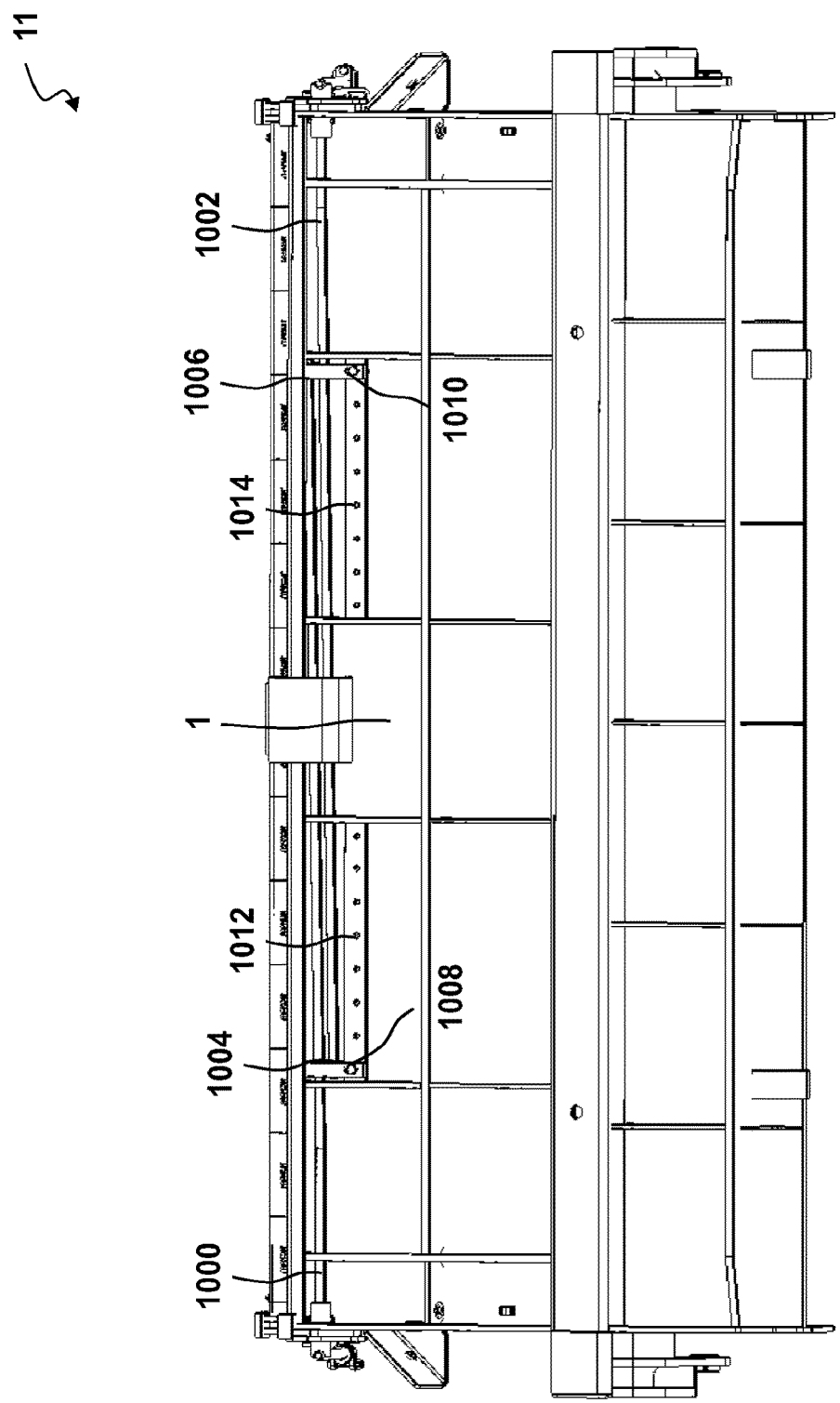
FIG. 9 shows a bottom perspective view of a lift platform having two torsion bars, according to one embodiment.
Figure 10:
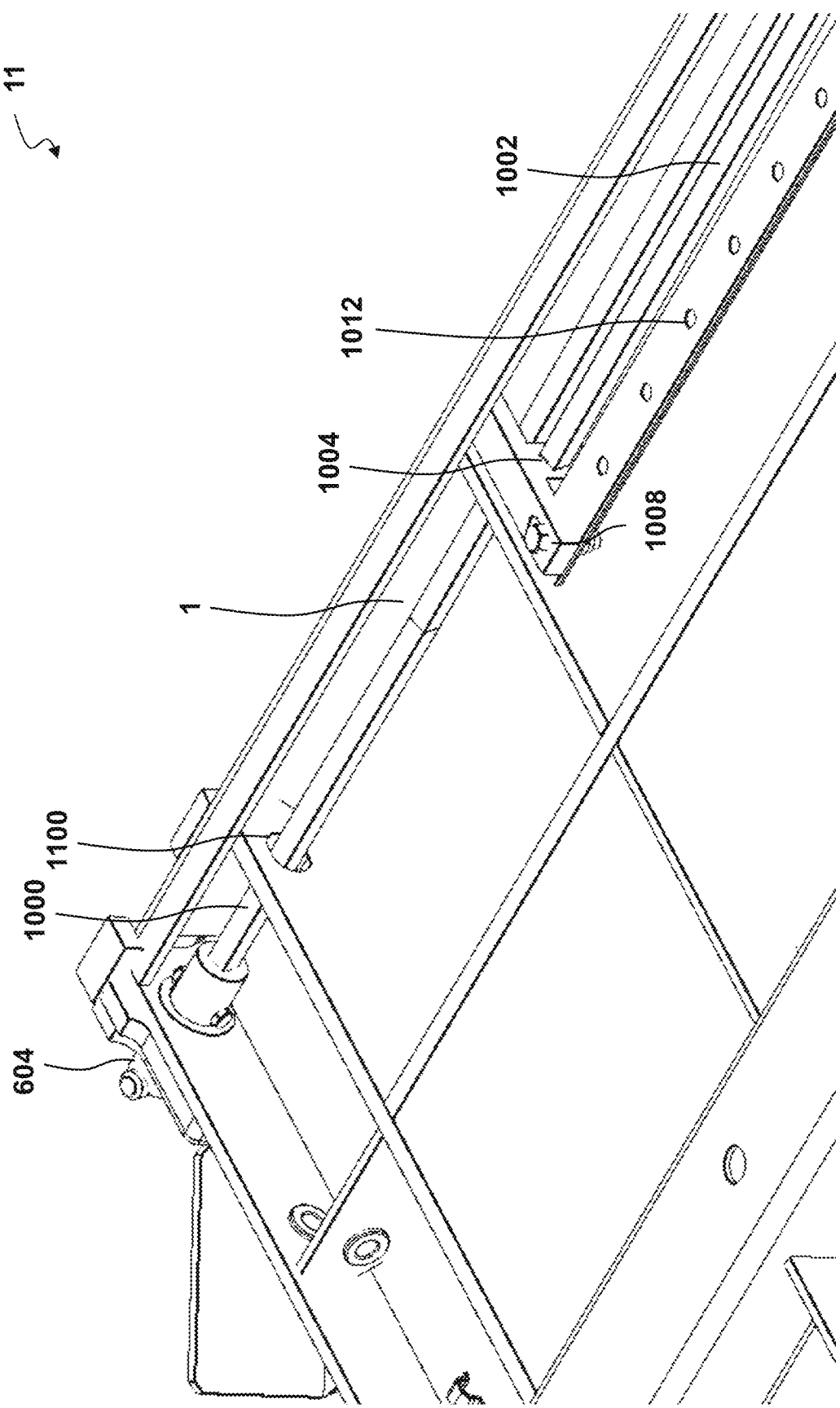
FIG. 10 shows a perspective view of the two torsion bars of FIG. 9, according to one embodiment.

FIG. 5 shows a perspective view of a torsion bar bracket 601 installed between a platform section 1 and a flipover 2 of a lift platform 11 in a half folded position, according to one embodiment. The torsion bar bracket 601 includes a sliding bar 600 and a rotatable portion 604. The torsion bar bracket 601 is fixedly connected to a torsion bar (FIGS. 9-10) disposed in the platform section 1. The sliding bar 600 is fixedly connected to the rotatable portion 604. The rotatable portion 604 is connected to a torsion bar disposed in the platform section 1, as shown in FIGS. 9-10. A distal end 612 of the sliding bar 600 is slidably connected to a sliding bar mount 606. The sliding bar mount 606 is pivotally connected to a receiver portion 602. The receiver portion 602 may be fixedly connected to a portion of the flipover 2, such as via a bracket connected to the flipover 2. In some embodiments, the receiver portion 602 may be welded to the bracket 2A. The bracket 2A may be attached to the flipover, such as via bolts, welding, or the like. The receiver portion 602 is rotatably or pivotally connected to the sliding bar mount 606. The sliding bar mount 606 is slidably connected to the sliding bar 600 such that the sliding bar 600 slides through the sliding bar mount 606 as the flipover 2 moves from a closed position to an open position, and vice versa.

The sliding bar mount 606 may include an adjustable mechanism 608, such as a nut and bolt, screw, fastener, or the like. In some embodiments, the adjustable mechanism 608 may be used to increase or decrease friction between the sliding bar 600 and the sliding bar mount 606. The adjustable mechanism 608 may increase pressure about a bushing 610 so as to increase friction between the sliding bar 600 and the sliding bar mount 606. The adjustable mechanism 608 may increase pressure about the bushing 610 so as to increase friction between the sliding bar 600 and the sliding bar mount 606. The adjustable mechanism 608 may increase or decrease an aperture holding the bushing 610 in the sliding bar mount 606 so as to increase or decrease friction, respectively. In other embodiments, the adjustable mechanism 608 may only act as a retainer to keep the bushing 610 in place.

The sliding bar mount 606 may include the bushing 610. The bushing 610 may surround the sliding bar 600 such that the sliding bar is in contact with the bushing 610 throughout movement of the flipover 2 between the closed position and the open position. The receiver portion 602 may be positioned such that a portion of the sliding bar 600 remains in the bushing 610 throughout movement of the flipover 2 between the open position and the closed position. In some embodiments, the adjustable mechanism 608 may be used to insert or remove the bushing 610. In other embodiments, the adjustable mechanism 608 may be used to increase or decrease friction between the bushing 610 and the sliding bar 600.

The bushing 610 may have an extended outer surface on a top portion of the bushing and/or a bottom portion of the bushing so as to be secured by the sliding bar mount 606. The extended outer surface of the bushing 610 may form a flange. In other embodiments, the bushing 610 may be secured without flanges by using a bolt on each side of the bushing 610 to hold the bushing 610 in place. In some embodiments, the adjustable mechanism 608 and sliding bar mount 606 may form a yoke holder about the bushing 610. The bushing 610 may have an inner aperture that corresponds to a shape and size of the sliding bar 600.

The bushing 610 may be made from plastic, such as a plastic nylon, Teflon, or the like. Other materials are possible and contemplated to provide the desired friction and durability. The bushing 610 is a sliding bearing.

A pull force is required to move the flipover 2 between a closed position and a vertical position and an open position and a vertical position, or vice versa. Without the bushing 610, the pull force may be between 30-40 pounds. With the bushing 610, the pull force may be reduced to about 7 pounds, with a maximum pull force of about 20 pounds. The bushing 610 prevents metal-on-metal contact, which may require increased force.

While one torsion bar bracket 601 is shown for the purposes of illustration, the torsion bar bracket 601 and associated elements may be located on each side of the lift platform 11 so as to provide even movement of the flipover 2 between the open position and the vertical position and the closed position and the vertical position.

Figure 6:
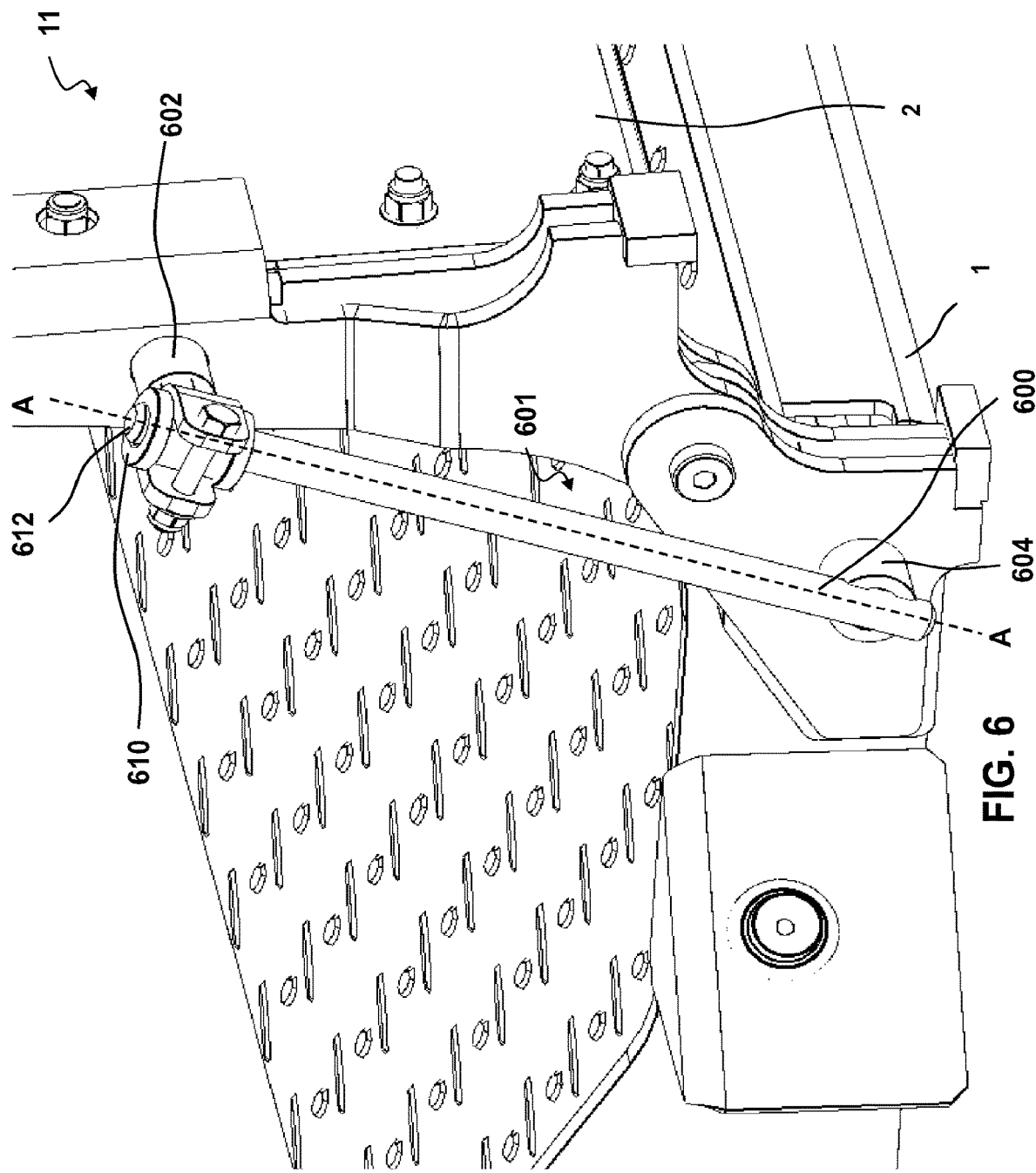
FIG. 6 shows a perspective view of the torsion bar bracket of FIG. 5 in a middle position, according to one embodiment.

FIG. 6 shows a perspective view of the torsion bar bracket 601 of FIG. 5 in a middle position, according to one embodiment. In the middle position, the flipover 2 is substantially perpendicular to the platform section 1. The distal end 612 of the sliding bar 600 is proximate and end of the bushing 610 in the middle position. In some embodiments, the receiver portion 602 may be positioned on the flipover 2 such that the distal end 612 of the torsion bar (FIGS. 9-10) may remain outside of the bushing 610 in the middle position. In other embodiments, at least a portion of the sliding bar 600 may remain inside the bushing 610 throughout movement of the flipover 2.

Figure 7:
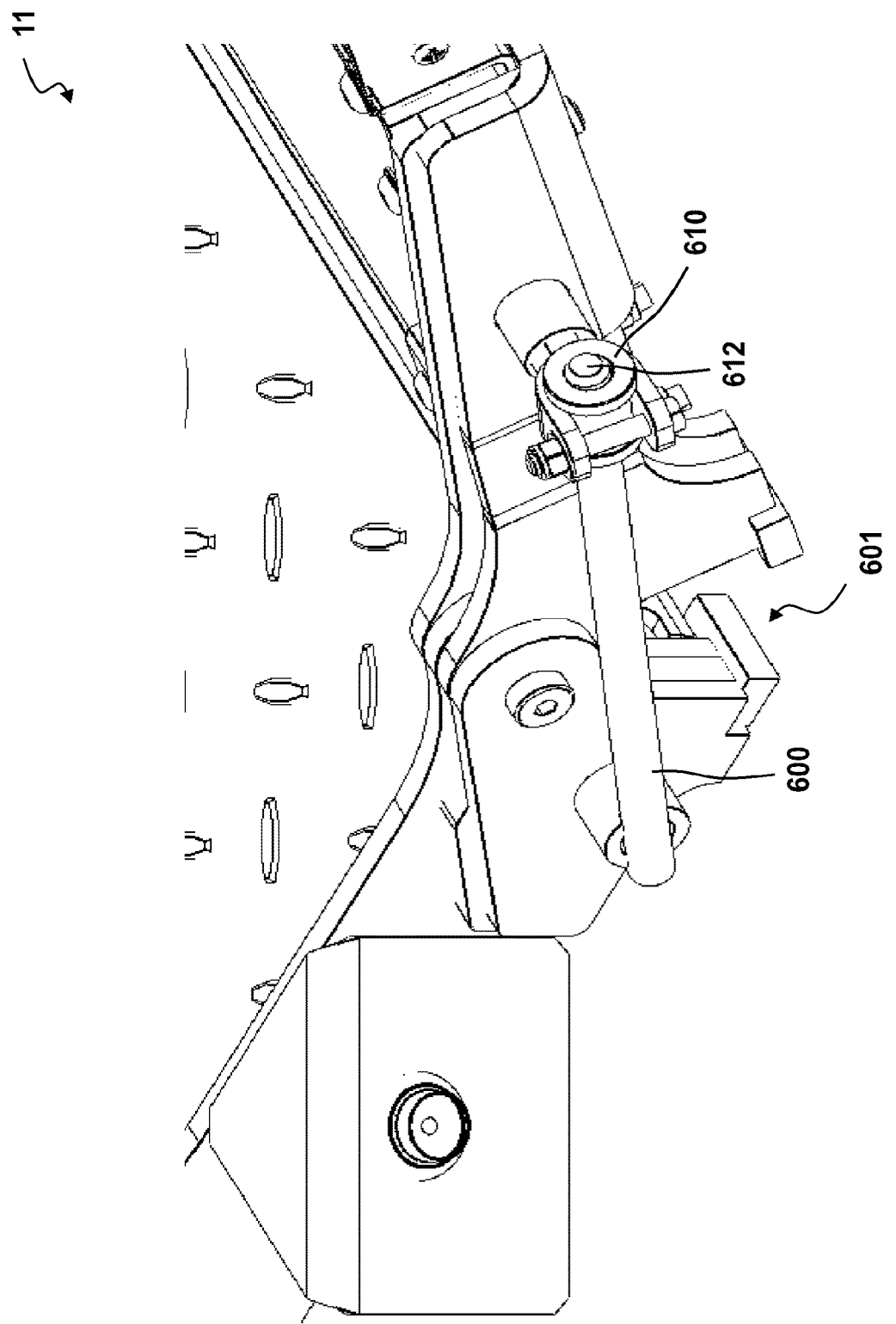
FIG. 7 shows a perspective view of the torsion bar bracket of FIG. 5 in a half open position, according to one embodiment.

FIG. 7 shows a perspective view of the torsion bar bracket 601 of FIG. 5 in a half open position, according to one embodiment. In the half open position, the distal end 612 of the sliding bar 600 may be proximate the bushing 610.

Figure 8:
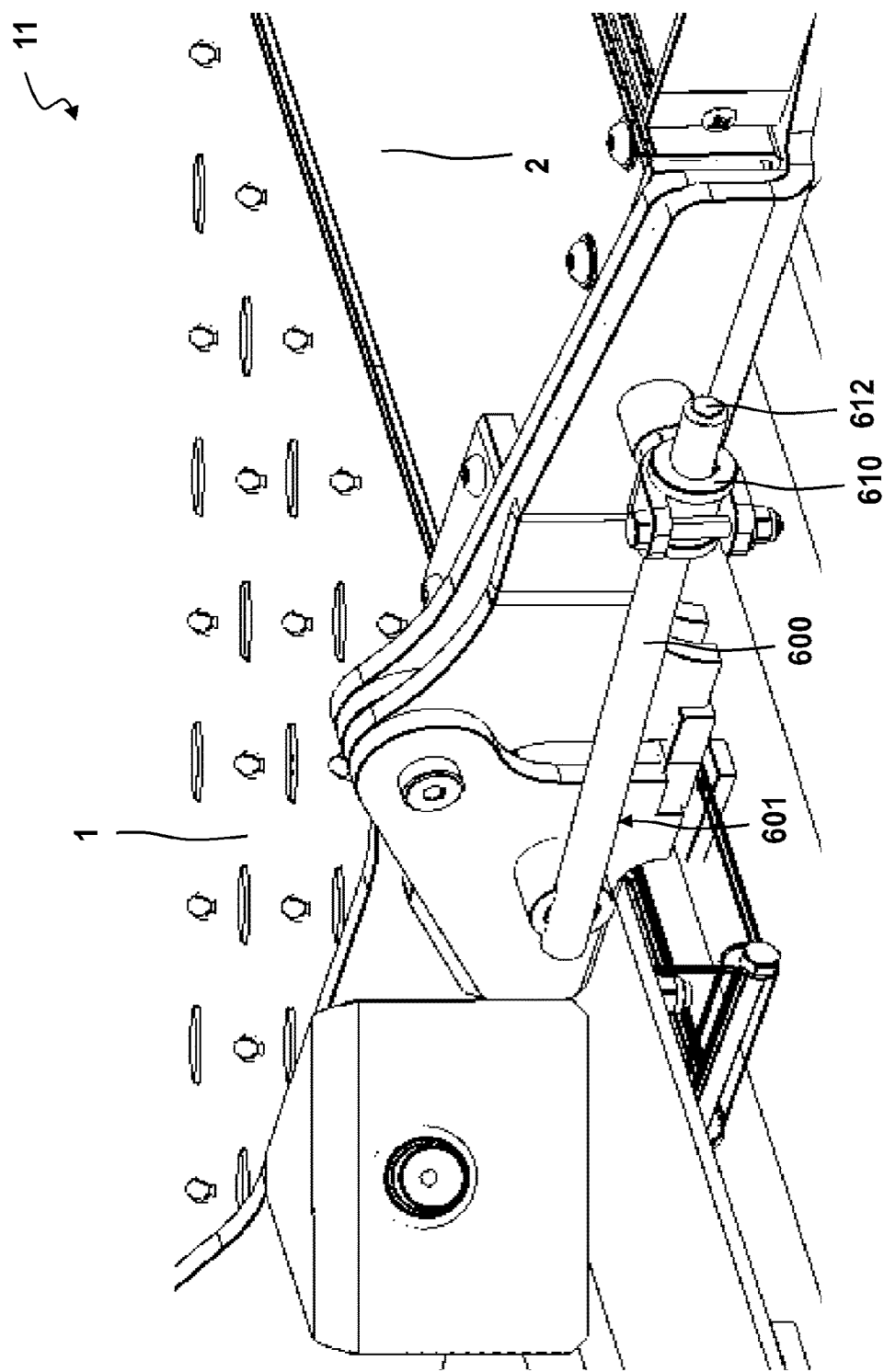
FIG. 8 shows a perspective view of the torsion bar bracket of FIG. 5 in an open position, according to one embodiment.

FIG. 8 shows a perspective view of the torsion bar bracket 601 of FIG. 5 in an open position, according to one embodiment. In the open position, the flipover 2 may be substantially parallel with the platform section 1. The distal end 612 of the sliding bar 600 has moved further away from the bushing 610 as compared to the half open position as shown in FIG. 7.

FIG. 9 shows a bottom perspective view of a lift platform having two torsion bars 1000, 1002, according to one embodiment. The torsion bar bracket, as shown in FIG. 5, may be disposed on each side of the lift platform 11. Each torsion bar bracket may be connected to a respective torsion bar 1000, 1002. The torsion bars may be disposed in the platform section 1 of the lift platform 11. A first torsion bar 1000 may be attached at a first attachment point 1006. A second torsion bar 1002 may be attached at a second attachment point 1004. The attachment point 1004, 1006 locations may be adjusted by moving each respective bracket 1008, 1010 to different attachment points 1012, 1014. Each bracket 1008, 1010 holds the respective torsion bar 1000, 1002. The attachment points 1012, 1014 may be two or more spaced holes for attaching each bracket 1008, 1010. Making the torsion bar shorter, i.e., moving the bracket closer to its respective torsion bar bracket, increases the helping torque provided. For example, moving the bracket 1010 to the left will increase the helping torque torsion bar 1000 provides. Each torsion bar 1000, 1002 may have a rotation or twist so as to assist in the opening and closing of the flipover (FIG. 8, 2) relative to the platform section 1. Each torsion bar 1000, 1002 may have a square cross section. Other torsion bar 1000, 1002 cross sections are possible and contemplated. Each torsion bar 1000, 1002 may have a length greater than half a width of the platform section 1. Other torsion bar 1000, 1002 lengths are possible and contemplated. In some embodiments, only one torsion bar may be used, such as on lighter flipovers where not as much helping torque is needed.

FIG. 10 shows a perspective view of the two torsion bars 1000, 1002 of FIG. 9, according to one embodiment. The platform section 1 may include one or more apertures 1100 to allow the torsion bars 1000, 1002 to extend through the platform section 1 and rotate during movement of the flipover (FIG. 8, 2) between the open position and the closed position. A rotatable portion, such as rotatable portion 604 of FIG. 6 may be attached to the first torsion bar 1000.

Figure 11:
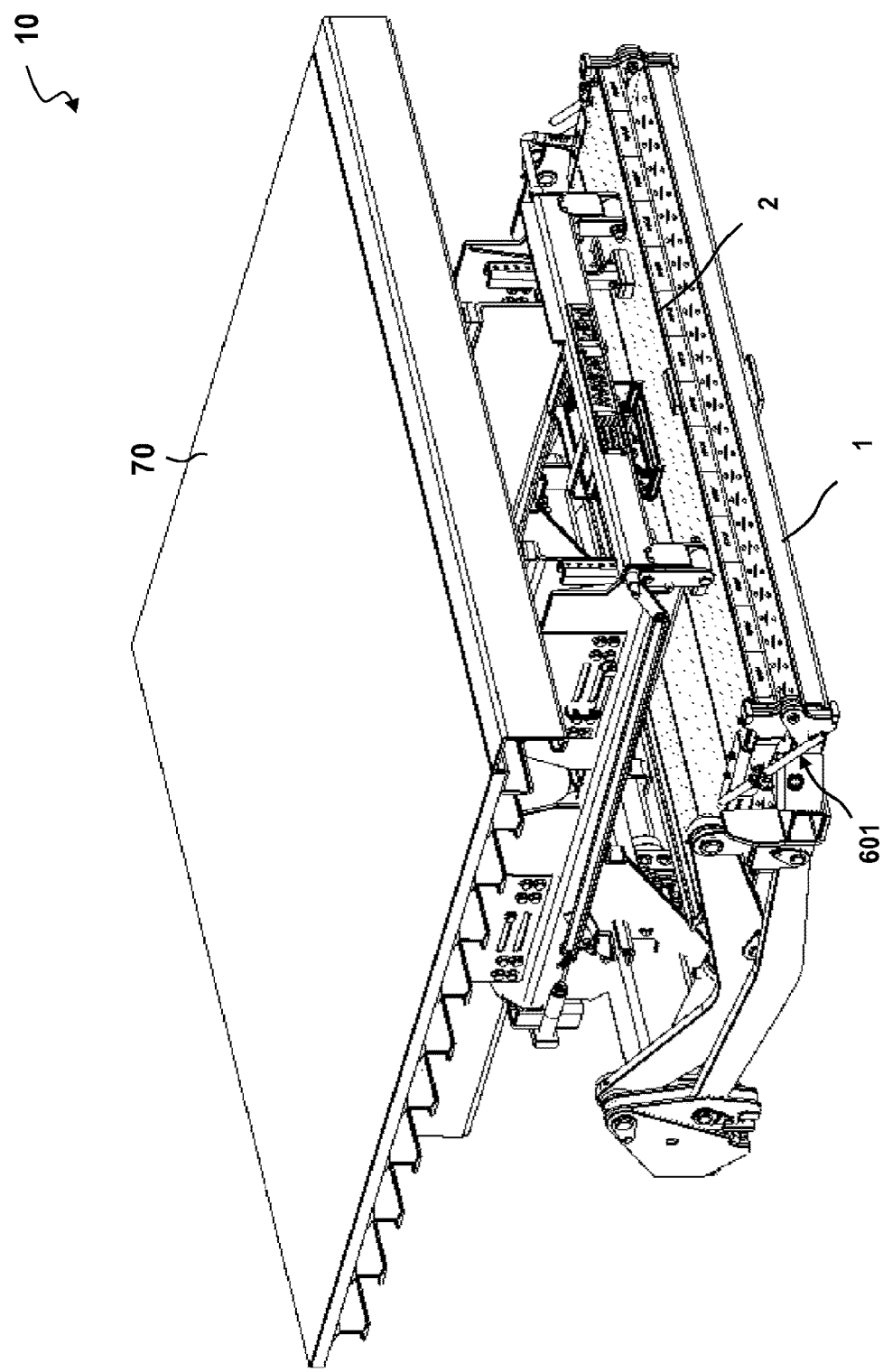
FIG. 11 shows a perspective view of a lift gate in a stowed position on a vehicle frame, according to one embodiment.

FIG. 11 shows a perspective view of a lift gate 10 in a stowed position on a vehicle 70 frame, according to one embodiment. In the stowed position, the lift gate 10 is disposed underneath the vehicle 70 frame and the flipover 2 is folded against the platform section 1.

Figure 12:
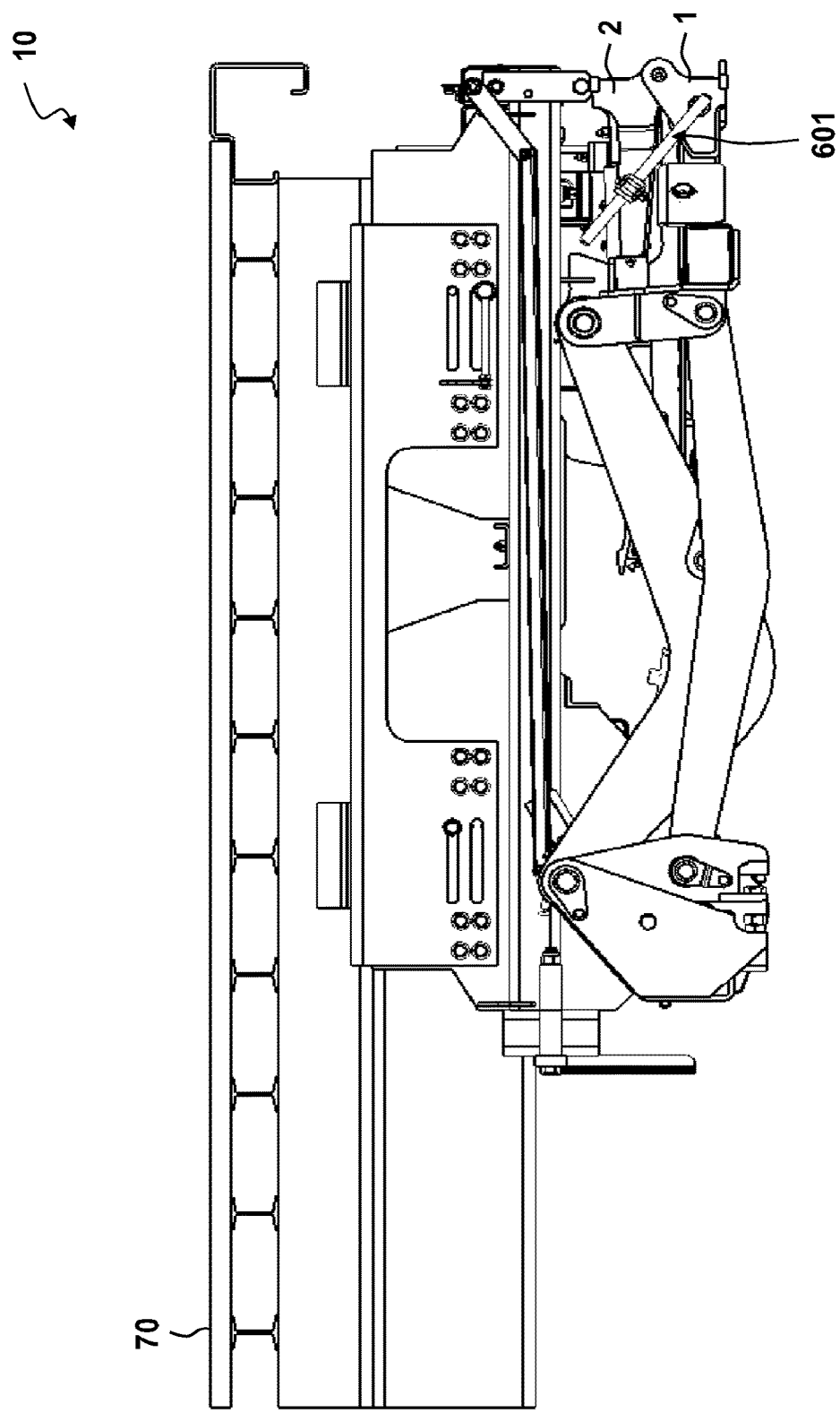
FIG. 12 shows a side view of the lift gate of FIG. 11 in the stowed position, according to one embodiment.

FIG. 12 shows a side view of the lift gate 10 of FIG. 11 in the stowed position, according to one embodiment. In the stowed position, the lift gate 10 is disposed underneath the vehicle 70 frame and the flipover 2 is folded against the platform section 1.

Figure 13:
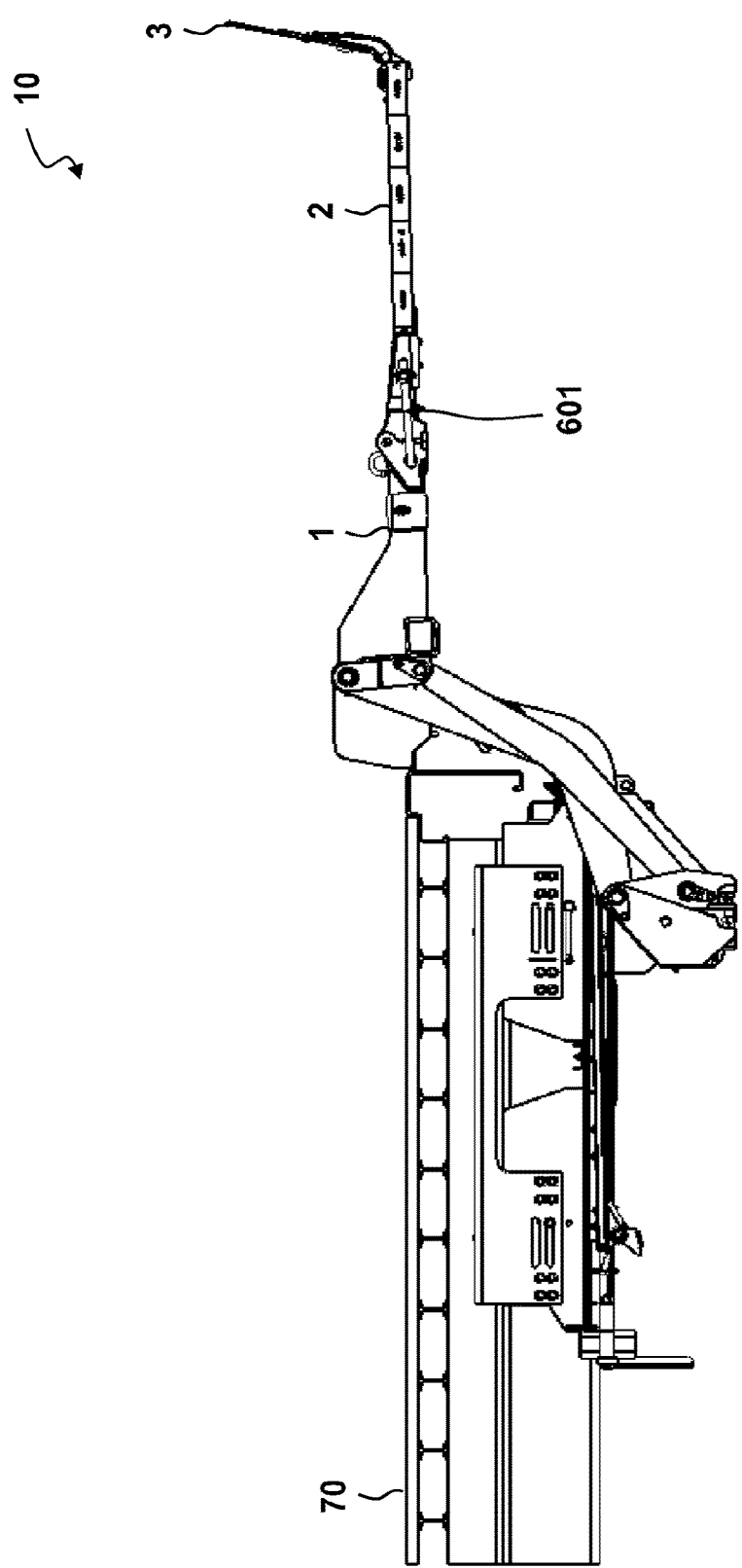
FIG. 13 shows a side view of the lift gate of FIG. 11 in an open and up position, according to one embodiment.

FIG. 13 shows a side view of the lift gate 10 of FIG. 11 in an open and up position, according to one embodiment. In the open and up position, the lift gate 10 is disposed such that the flipover 2 is substantially parallel with the platform section 1 and vehicle 70 frame so as to allow for loading and unloading of items between the vehicle 70 frame and the platform section 1. The ramp 3 is depicted in an upright position, but may be moved so as to be substantially parallel to the flipover 2.

Figure 14:
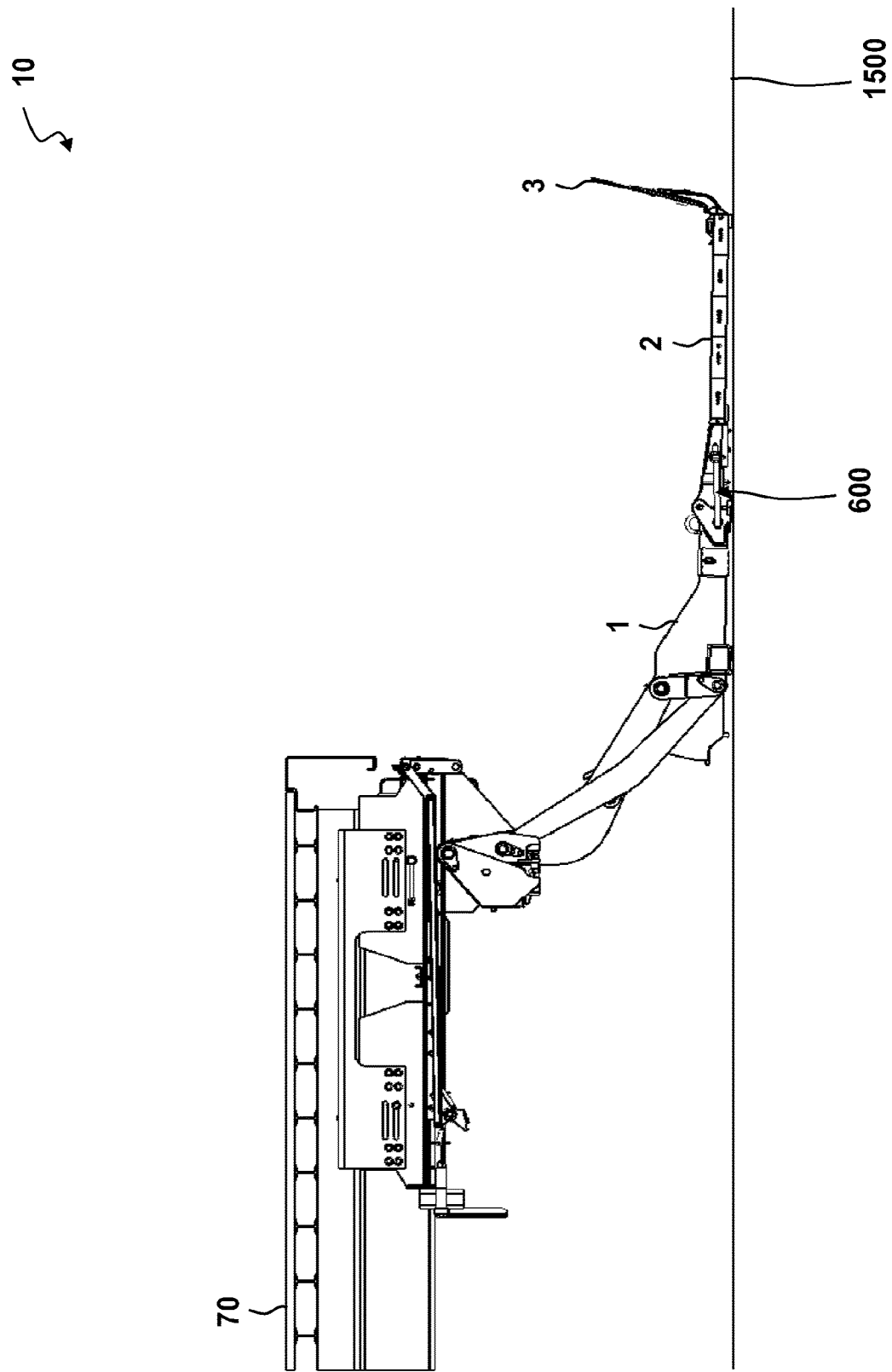
FIG. 14 shows a side view of the lift gate of FIG. 11 in an open and down position, according to one embodiment.

FIG. 14 shows a side view of the lift gate 10 of FIG. 11 in an open and down position, according to one embodiment. In the open and down position, the lift gate 10 is disposed such that the flipover 2 is substantially parallel with the platform section 1 and a ground 1500 or external surface so as to allow for loading and unloading of items between the ground 1500 and the lift platform. The ramp 3 is depicted in an upright position, but may be moved so as to provide a ramping surface between the flipover 2 and the ground 1500.

Figure 15:
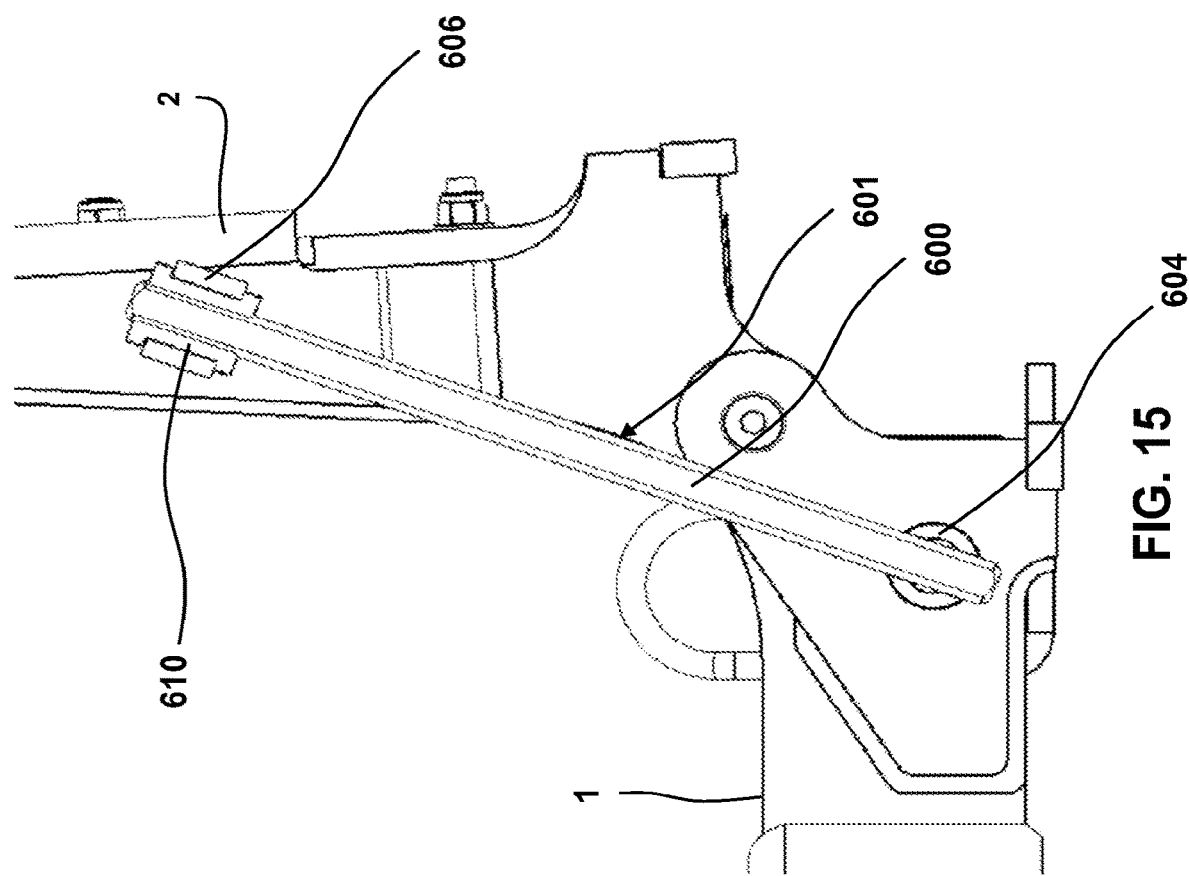
FIG. 15 shows a cross-sectional view of the torsion bar bracket about line A-A of FIG. 6, according to one embodiment.

FIG. 15 shows a cross-sectional view of the torsion bar bracket 601 about line A-A of FIG. 6, according to one embodiment. The sliding bar 600 is fixedly attached to the rotatable portion 604. The sliding bar 600 is slidably connected to the sliding bar mount 606 via the bushing 610.

Figure 16:
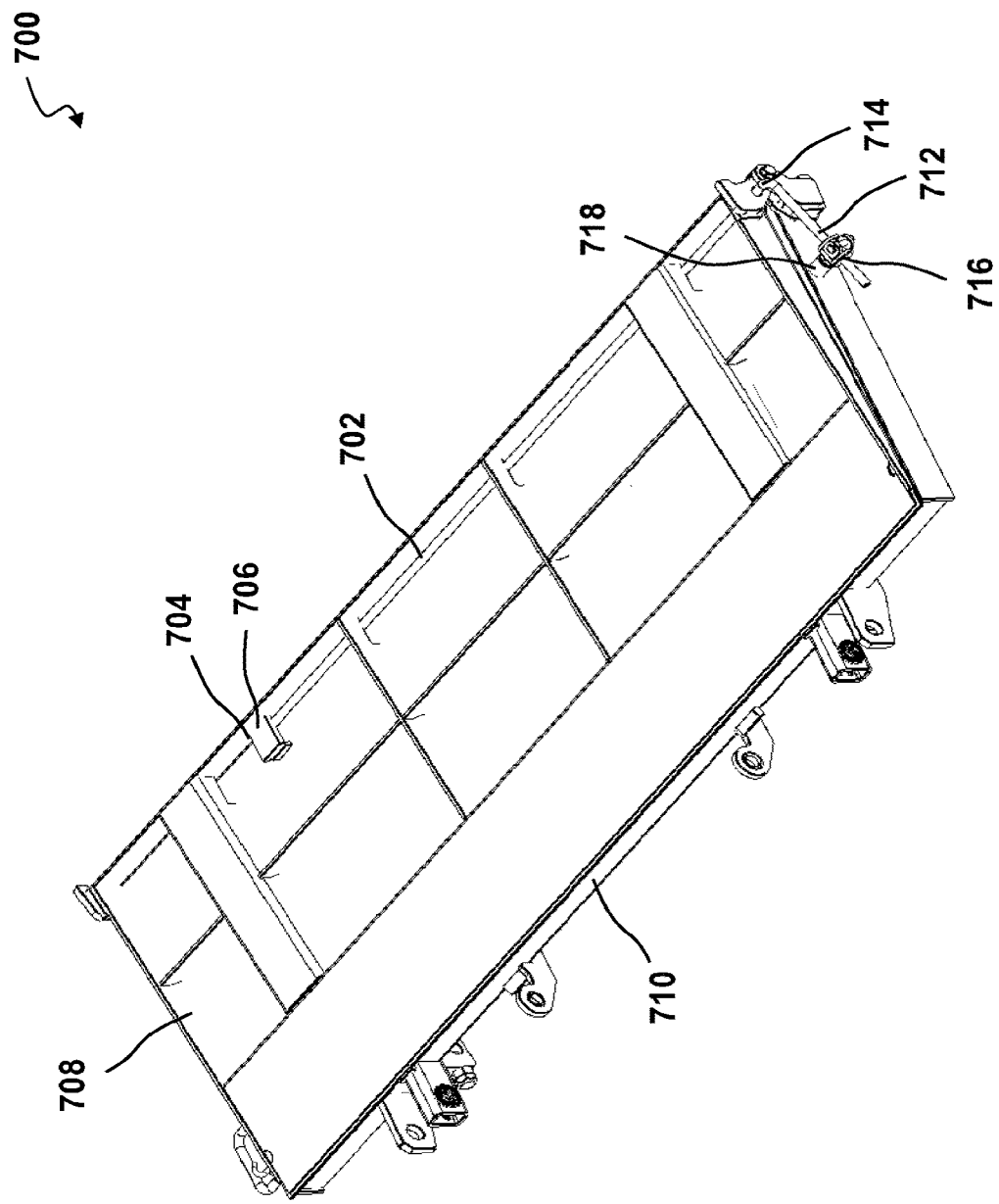
FIG. 16 shows a perspective view of a lift platform in a closed position having a single torsion bar, according to one embodiment.

FIG. 16 shows a perspective view of a lift platform 700 in a closed position having a single torsion bar 702, according to one embodiment. The lift platform 700 may include a platform section 710 and a flipover 708. The flipover 708 may move relative to the platform section 710 from a closed position as in FIG. 16 to a vertical position (See FIG. 17) and an open position where the flipover 708 is substantially in-line with the platform section 710. The disclosed system reduces the pull force required to move the flipover 708 between an open position and a vertical position, as in FIG. 17. The system also reduces the pull force required to move the flipover between a closed position as in FIG. 16 and a vertical position, as in FIG. 17.

The single torsion bar 702 may include a sliding bar 712 disposed between the platform section 710 and the flipover 708 of the lift platform 700. The single torsion bar 702 may also include a rotatable portion 714. In some embodiments, the sliding bar 712 and the rotatable portion 714 may be a part of the single torsion bar 702 and the single torsion bar may be a single piece, such as a single piece of metal. Holes or apertures in the flipover 708 may allow the single torsion bar 702 to extend through the flipover 708 and allow the single torsion bar 702 to rotate relative to the flipover 708. A bushing 716 may receive at least a portion of the sliding bar 712 of the single torsion bar 702 to reduce the required pull force further and prevent metal-to-metal contact. The bushing 716 may be made from a plastic, such as plastic nylon, Teflon, or the like. The bushing 716 acts as a sliding bearing to overcome sliding friction in the system. A receiver portion 718 may be connected to the platform section 710. A sliding bar mount may be pivotally connected to the receiver portion, and the bushing 716 may be disposed in the sliding bar mount.

The single torsion bar 702 may have a first end 704 that is distal from a second end on the sliding bar 716 of the single torsion bar 702. The first end 704 may be attached to the flipover 708 at an attachment point 706, such as a bracket. The first end 704 of the single torsion bar 702 may have a bend so as to secure the single torsion bar 702 to the flipover 708 so that it cannot be removed from the attachment point 706 during operation of the flipover 708. In other embodiments, the single torsion bar 702 may be secured by the attachment point 706.

Figure 17:
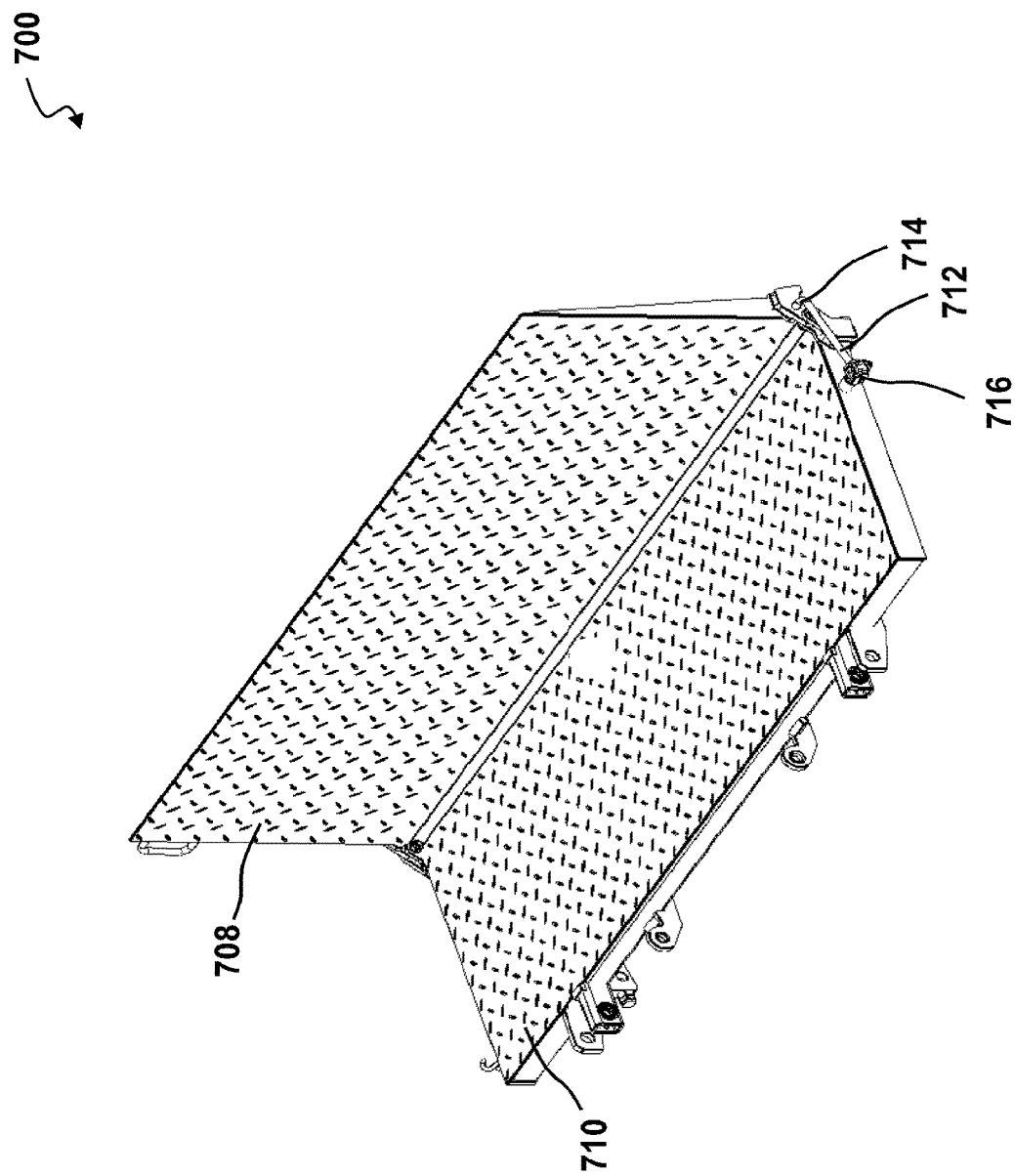
FIG. 17 shows a perspective view of the lift platform of FIG. 16 in a vertical position, according to one embodiment.

FIG. 17 shows a perspective view of the lift platform 700 of FIG. 16 in a vertical position, according to one embodiment. In the vertical position, the angle between the flipover 708 and the platform section 710 is 90 degrees. The vertical position is a zero torque position in the system. When the flipover 708 goes from the vertical position to the open position, it twists the torsion bar (702, FIG. 16) which then provides torque when the user wants to move the flipover 708 from the open position to the vertical position, and vice versa. The single torsion bar may be a single bar that includes the rotatable portion 714 and the sliding bar 712. The bushing 716 receives at least a portion of the single torsion bar. The torsion bar disclosed herein may be made from a single piece, as in FIGS. 16-17, or multiple pieces. The torsion bar disclosed herein may be disposed in the flipover, as in FIGS. 16-17, or in the platform section, as in FIGS. 5-10. The torsion bar disclosed herein may be a single torsion bar, as in FIGS. 16-17, or multiple torsion bars, as in FIGS. 9-10. In one embodiment, a first torsion bar may be disposed in a flipover section and a second torsion bar may be disposed in a platform section. The cross section of the flipover and corresponding bushing may be any shape, as shown and described in FIG. 18.

Figure 18:
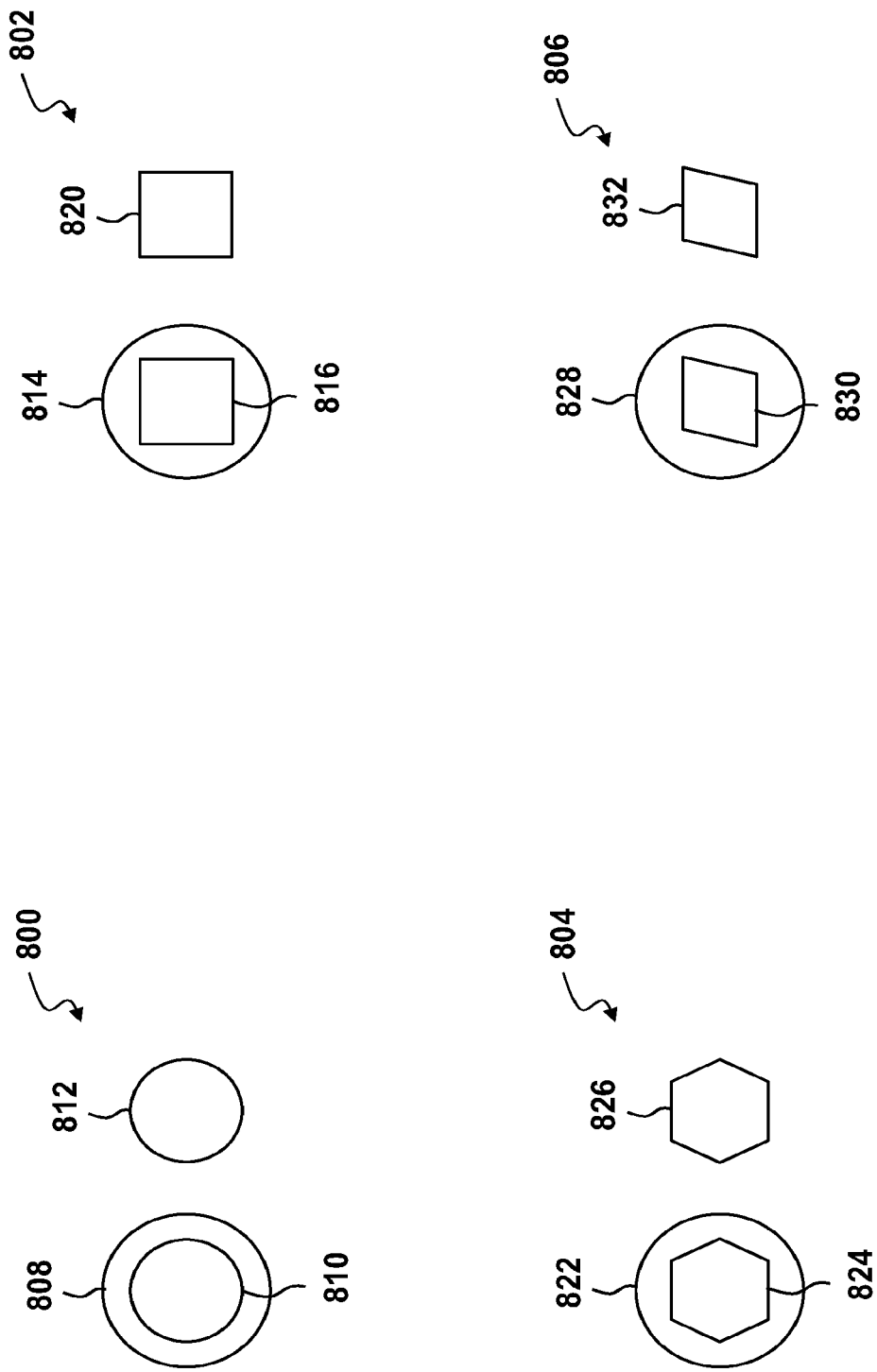
FIG. 18 shows various bushing and torsion bar combinations, according to one embodiment.

FIG. 18 shows various bushing and torsion bar combinations 800, 802, 804, 806, according to one embodiment. In a first combination 800, a bushing 808 may have a perimeter of an aperture 810 that corresponds to a cross-section of a sliding bar 812. In a second combination 802, a bushing 814 may have a perimeter of an aperture 816 that corresponds to a cross-section of a sliding bar 820. In a third combination 804, a bushing 822 may have a perimeter of an aperture 824 that corresponds to a cross-section of a sliding bar 826. In a fourth combination 806, a bushing 828 may have a perimeter of an aperture 830 that corresponds to a cross-section of a sliding bar 832. Other combinations and shapes of the perimeter of the apertures and corresponding sliding bars are possible and contemplated. The bushing may be sized and dimensioned to include an aperture that receives a corresponding sized and shaped sliding bar so as to reduce a pull force for moving the flipover between at least one of: an open position and a middle position, and a closed position and a middle position.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
   a sliding bar disposed between a platform section and a flipover of a lift platform;
   a sliding bar mount pivotally connected to the flipover;
   a rotatable portion fixedly connected to the sliding bar, wherein the rotatable portion is rotatable relative to the platform section;
   a torsion bar disposed in the lift platform, wherein the torsion bar is connected to the rotatable portion at one end and to a first attachment point in the lift platform along a length of the torsion bar, wherein the torsion bar comprises a twist between the rotatable portion and the first attachment point to reduce a pull force for moving the flipover, wherein the torsion bar is connected to the first attachment point using an adjustment mechanism configured for selective adjustment of a torque exerted by the torsion bar; and
   a bushing disposed in the sliding bar mount, wherein the bushing slidably receives a portion of the sliding bar and a contact surface between an outer surface of the sliding bar and an inner surface of the bushing is maintained to allow reduced sliding friction;
   wherein the bushing allows the sliding bar to slide relative to the sliding bar mount;
   wherein the bushing reduces a pull force for moving the flipover;
   wherein the bushing comprises at least one flange to secure the bushing in the sliding bar mount; and
   wherein the adjustment mechanism comprises a bracket, wherein the lift platform includes two or more different attachment points arranged in a direction that the torsion bar extends, wherein the attachment points are two or more spaced holes for engaging with the bracket, and wherein a location of the first attachment point is adjusted by moving the bracket among the two or more spaced holes of the different attachment points and engaging the bracket with any one of the two or more spaced holes.

2. The system of claim 1, wherein the bushing reduces the pull force for moving the flipover between an open position and a middle position.

3. The system of claim 1, wherein the bushing reduces the pull force for moving the flipover between a closed position and a middle position.

4. The system of claim 1, wherein the bushing is made from a plastic material, and wherein the sliding bar is made from a metal material.

5. The system of claim 1, wherein the bushing is at least one of: a plastic nylon and Polytetrafluoroethylene (PTFE).

6. The system of claim 1, wherein the rotatable portion comprises a cylindrical shape including a first end surface and a second end surface opposite to the first end surface, wherein the rotatable portion is fixedly connected to the sliding bar such that an extended direction of the sliding bar is positioned in parallel to the first end surface, and wherein the torsion bar is fixedly connected to the second end surface of the rotatable portion and the first attachment point in the lift platform.

7. The system of claim 1, further comprising:
a receiver portion connected to the lift platform.

8. The system of claim 1, wherein the adjustment mechanism is configured for adjusting the location of said connection to the torsion bar to adjust the distance between the torsion bar and the attachment point for varying the torque exerted by a twisting of the torsion bar.

9. A system comprising:
a lift platform comprising:
a platform section; and
a flipover, wherein the flipover moves relative to the platform section;
a torsion bar bracket installed between the platform section and the flipover of the lift platform;
a torsion bar disposed in the lift platform, wherein the torsion bar is attached to the torsion bar bracket at a first end of the torsion bar and attached at a first attachment point in the lift platform at a second end of the torsion bar along a length of the torsion bar, wherein the torsion bar comprises a twist between a rotatable portion and the first attachment point to reduce a pull force for moving the flipover, wherein the torsion bar is connected to the first attachment point in the lift platform using an adjustment mechanism configured for selective adjustment of a torque exerted by the torsion bar;
a sliding bar disposed between the platform section and the flipover of the lift platform, wherein the sliding bar is connected to the torsion bar; and
a bushing of the torsion bar bracket, wherein the bushing slidably receives a portion of the sliding bar and a contact surface between an outer surface of the sliding bar and an inner surface of the bushing is maintained to allow reduced sliding friction, wherein the bushing allows the sliding bar to slide relative to the torsion bar bracket, wherein the bushing comprises at least one flange to secure the bushing in the torsion bar bracket, and wherein the bushing reduces a pull force for moving the flipover;

wherein the adjustment mechanism comprises a bracket, wherein the lift platform includes two or more different attachment points arranged in a direction that the torsion bar extends, wherein the attachment points are two or more spaced holes for engaging with the bracket, and wherein a location of the first attachment point is adjusted by moving the bracket among the two or more spaced holes of the different attachment points and engaging the bracket with any one of the two or more spaced holes.

10. The system of claim 9, wherein the platform section is substantially parallel with the flipover in an open position, wherein the platform section is substantially perpendicular to the flipover in a middle position, and wherein the flipover is folded over the platform section in a closed position.

11. The system of claim 9, wherein the torsion bar is configured to reduce the pull force for moving the flip over between at least two of: the open position, the middle position, and the closed position; and wherein the bushing is configured to reduce the pull force for moving the flip over between at least two of: the open position, the middle position, and the closed position.

12. The system of claim 9, wherein the rotatable portion comprises a cylindrical shape including a first end surface and a second end surface opposite to the first end surface, wherein the rotatable portion is fixedly connected to the sliding bar such that an extended direction of the sliding bar is positioned in parallel to the first end surface, and wherein the torsion bar is fixedly connected to the second end surface of the rotatable portion and the first attachment point in the lift platform.

13. The system of claim 9, wherein the torsion bar bracket further comprises:
the rotatable portion connected to the lift platform, wherein the sliding bar is connected to the rotatable portion, and wherein the torsion bar is connected to the rotatable portion.

14. The system of claim 13, wherein the torsion bar bracket further comprises:
a receiver portion connected to the lift platform; and
a sliding bar mount pivotally connected to the receiver portion; and
wherein the bushing is disposed in the sliding bar mount.

15. The system of claim 9, wherein the adjustment mechanism is configured for adjusting the location of said connection to the torsion bar to adjust the distance between the torsion bar and the attachment point for varying the torque exerted by a twisting of the torsion bar.

16. A system comprising:
a lift platform comprising:
a platform section; and
a flipover, wherein the flipover moves relative to the platform section;
a first torsion bar bracket installed between the platform section and the flipover of the lift platform on a first side of the lift platform;
a first torsion bar disposed in the platform section, wherein the first torsion bar is attached to the first torsion bar bracket via a first bushing at a first end of the first torsion bar and attached at a first attachment point in the platform section at a second end of the first torsion bar along a length of the first torsion bar, wherein the first torsion bar comprises a twist between a first rotatable portion and the first attachment point to reduce a pull force for moving the flipover, wherein the first torsion bar is connected to the first attachment point using an adjustment mechanism configured for selective adjustment of a torque exerted by the first torsion bar;

a second torsion bar bracket installed between the platform section and the flipover of the lift platform on a second side of the lift platform, wherein the second side of the lift platform is opposite the first side of the lift platform; and a second torsion bar disposed in the platform section, wherein the second torsion bar is attached to the second torsion bar bracket via a second bushing at a first end of the second torsion bar and attached at a second attachment point in the platform section at a second end of the second torsion bar along a length of the second torsion bar, wherein the second torsion bar comprises a twist between a second rotatable portion and the second attachment point to reduce a pull force for moving the flipover, wherein the second torsion bar is connected to the second attachment point using an adjustment mechanism configured for selective adjustment of a torque exerted by the second torsion bar;

wherein the first bushing and the second bushing reduces a pull force for moving the flipover;

wherein the first bushing allows the first torsion bar to slide relative to the first torsion bar bracket;

wherein the first bushing slidably receives a portion of the first torsion bar and a contact surface between an outer surface of the first torsion bar and an inner surface of the first bushing is maintained to allow reduced sliding friction;

wherein the first bushing comprises at least one flange to secure the first bushing in the first torsion bar bracket;

wherein the second bushing slidably receives a portion of the second torsion bar and a contact surface between an outer surface of the second torsion bar and an inner surface of the second bushing is maintained to allow reduced sliding friction;

wherein the second bushing allows the second torsion bar to slide relative to the second torsion bar bracket;

wherein the second bushing comprises at least one flange to secure the second bushing in the second torsion bar bracket;

wherein at least one of the first adjustment mechanism and the second adjustment mechanism comprises a bracket, wherein the lift platform includes two or more different attachment points arranged in a direction that the first torsion bar extends, wherein the attachment points are two or more spaced holes for engaging with the bracket, and wherein a location of the first attachment point is adjusted by moving the bracket among the two or more spaced holes of the different attachment points and engaging the bracket with any one of the two or more spaced holes.

17. The system of claim 16, wherein the platform section is substantially parallel with the flipover in an open position, wherein the platform section is substantially perpendicular to the flipover in a middle position, and wherein the flipover is folded over the platform section in a closed position.

18. The system of claim 16, wherein the torsion bar is configured to reduce the pull force for moving the flip over between at least two of: the open position, the middle position, and the closed position; and wherein the first bushing and the second bushing are configured to reduce the pull force for moving the flip over between at least two of: the open position, the middle position, and the closed position.

19. The system of claim 16, wherein the first rotatable portion comprises a cylindrical shape including a first end surface and a second end surface opposite to the first end surface, wherein the first rotatable portion is fixedly connected to a first sliding bar connected to the first torsion bar such that an extended direction of the first sliding bar is positioned in parallel to the first end surface, and wherein the first torsion bar is fixedly connected to the second end surface of the first rotatable portion and the first attachment point in the lift platform.

20. The system of claim 16, wherein the adjustment mechanism is configured for adjusting the location of said connection to the first torsion bar to adjust the distance between the first torsion bar and the attachment point for varying the torque exerted by a twisting of the first torsion bar.

* * * * *